US011556722B1

(12) United States Patent
Ben Shahar et al.

(10) Patent No.: US 11,556,722 B1
(45) Date of Patent: Jan. 17, 2023

(54) SYSTEM AND METHOD FOR EDITING TRANSCRIPTIONS WITH IMPROVED READABILITY AND CORRECTNESS

(71) Applicant: One AI, Inc., San Francisco, CA (US)

(72) Inventors: Amit Ben Shahar, Herzelia (IL); Yosef Asi Sheffer, Tel Aviv (IL); Artem Kramov, Chutove (UA)

(73) Assignee: ONE AI, INC., San Francisco, CA (US)

( * ) Notice: Subject to any disclaimer, the term of this patent is extended or adjusted under 35 U.S.C. 154(b) by 0 days.

(21) Appl. No.: 17/897,176

(22) Filed: Aug. 28, 2022

(51) Int. Cl.
```
G06F 40/30      (2020.01)
G10L 15/00      (2013.01)
G06F 40/51      (2020.01)
G06F 40/35      (2020.01)
G06F 40/211     (2020.01)
```

(52) U.S. Cl.
CPC .......... G06F 40/51 (2020.01); G06F 40/211 (2020.01); G06F 40/35 (2020.01)

(58) Field of Classification Search
CPC .... G06F 40/211; G06F 40/253; G06F 40/268; G06F 40/284; G06F 40/30; G10L 15/00
See application file for complete search history.

(56) References Cited

U.S. PATENT DOCUMENTS

| | | | | |
|---|---|---|---|---|
| 7,580,838 B2* | 8/2009 | Divay | ................ | G10L 15/22 704/9 |
| 7,930,168 B2* | 4/2011 | Weng | .................. | G10L 15/19 704/9 |
| 8,818,793 B1* | 8/2014 | Bangalore | ............. | G06F 40/284 715/255 |
| 8,849,648 B1* | 9/2014 | Bangalore | ............... | G10L 15/26 704/251 |
| 10,186,257 B1* | 1/2019 | Corfield | .................. | G10L 15/18 |
| 2002/0156627 A1* | 10/2002 | Itoh | ........................ | G10L 15/187 704/E15.02 |
| 2007/0078642 A1* | 4/2007 | Weng | ..................... | G10L 15/19 704/4 |
| 2008/0046229 A1* | 2/2008 | Maskey | ................. | G06F 40/289 704/2 |
| 2010/0131260 A1* | 5/2010 | Bangalore | ............... | G06F 40/58 704/3 |
| 2011/0040554 A1* | 2/2011 | Audhkhasi | ............ | G09B 19/04 704/235 |
| 2011/0213610 A1* | 9/2011 | Chen | ........................ | G09B 7/02 704/E11.001 |
| 2014/0337370 A1* | 11/2014 | Aravamudan | ........ | G06F 16/245 707/759 |

(Continued)

OTHER PUBLICATIONS

Lou et al., title={Disfluency detection using a noisy channel model and a deep neural language model}, 2018, journal={arXiv preprint arXiv:1808.09091}, pp. 1-7. (Year: 2018).*

*Primary Examiner* — Lamont M Spooner

(74) *Attorney, Agent, or Firm* — The Roy Gross Law Firm, LLC; Roy Gross

(57) ABSTRACT

Disclosed are a computer implemented method, system and platform for improving the readability and/or coherency of a conversation transcript, which include the applying of a speech disfluency detection model to identify speech disfluencies in a text transcript and to provide a corrected and/or annotated version of the conversation transcript indicating the edits made vis-à-vis the inputted text transcript.

14 Claims, 2 Drawing Sheets

(56) References Cited

U.S. PATENT DOCUMENTS

| | | | |
|---|---|---|---|
| 2021/0056956 A1* | 2/2021 | Dimitriadis | G10L 15/1815 |
| 2021/0375289 A1* | 12/2021 | Zhu | G10L 15/26 |
| 2021/0375291 A1* | 12/2021 | Zeng | G06F 16/535 |
| 2022/0059095 A1* | 2/2022 | Faria | G10L 15/26 |
| 2022/0189486 A1* | 6/2022 | Yim | G06F 40/279 |

* cited by examiner

SYSTEM AND METHOD FOR EDITING TRANSCRIPTIONS WITH IMPROVED READABILITY AND CORRECTNESS

TECHNOLOGICAL FIELD

The present disclosure generally relates to a system and method for automated processing of a text using a variety of machine learning (ML) and/or natural language processing (NLP) models, in particular for identifying mistakes and/or incoherent speech while taking into consideration the intended meaning and for correcting the text accordingly.

BACKGROUND

Automatic (non-human) speech recognition/transcription (AST) converts speech to text. However, very often the transcribed text is inaccurate and at times incoherent and difficult to read due to transcription mistakes, which may be a result of unclear speech, use of filler words, unusual names and, in particular, due to speech repair.

Accordingly, transcribed texts typically need re-writing by a human editor. However, such solution is expensive and non-scalable. Pattern matching has also proved inefficient, since the possibilities of language are endless and often the mistakes differ at least a bit in each transcribed text, even when the speaker is the same subject.

There therefore remains a need for a system and method that enables automated editing of transcribed texts which require little if any human input when applied and which do not rely on pattern identification.

SUMMARY

Aspects of the disclosure, according to some embodiments thereof, relate to systems, platforms and methods that enable automated editing of transcribed texts capable of fixing mistakes and inaccuracies to provide a corrected and meaningful text.

The herein disclosed system and method enables fixing mistakes and inaccuracies typically associated with informal speech such as word repetitions, use of filler words, reparanda resulting from speech repair (further defined hereinbelow), the latter being particularly complex. Advantageously, the herein disclosed systems, platforms and methods require little if any human input and do not rely on pattern identification.

As a further advantage, using a sliding window approach, in which the text is analyzed and/or processed in segments (also referred to herein as "edit zones"), allows utilizing complex and computational heavy NLP models economically in terms of computational time and burden.

In addition, the herein disclosed system and method applies machine learning models combined with syntactic and grammatical analysis of the text to identify the parts of the text that require fixing, a second model that re-writes the text, and a third model that assesses the correctness and readability of the re-written text to choose between different potential fixes and ensure the coherency and readability of the re-written text, preferably in comparison to the source text. The coherency and readability are preferably evaluated utilizing an NLP model, trained for text generation (also referred to as "language model" and "LM"), and the coherency and readability evaluated according to the probability that the language model would generate the re-written text, under the assumption that the trained language model will favor more coherent and readable texts.

According to some embodiments, removing parts of the text, such as reparanda and filler words/sentences may at times require removal of superfluous commas. Comma removal may be a complex process in that removing a comma can change the meaning of the text. Accordingly, the herein disclosed system and computational method executes comma removal (as well as other punctuation changes), while taking into consideration larger parts of the transcript (at times even the entire transcript).

According to some embodiments, there is provided a computer implemented method for enhancing/improving readability and/or coherency of a conversation transcript, the method comprising: receiving and/or inputting a conversation transcript, applying an NLP model capable of automatically identifying and fixing syntactic and/or grammatic errors in the conversation transcript to obtain a grammatically corrected version of the conversation transcript, applying a speech disfluency detection model configured to identify speech disfluencies in the grammatically corrected conversation transcript and to provide an annotated conversation transcript indicating portions in the grammatically corrected conversation transcript comprising speech disfluencies, wherein the speech disfluencies are selected from filler phrases, discourse markers, reparanda and any combination thereof; removing any identified filler phrase and/or discourse marker; dividing the annotated conversation transcript into edit zones, each edit zone comprising 'n' reparanda and 'm' commas surrounding the reparanda; generating a permutation set for an edit zone, each permutation in the permutation set including/excluding different of the 'n' reparanda; thereby obtaining different optional versions of the grammatically corrected conversation transcript, scoring each permutation of the permutation set by applying a language model on the different optional versions of the grammatically corrected conversation transcript; and selecting the permutation receiving a highest score, thereby obtaining a repaired version of the edit zone.

According to some embodiments, each 'n' is an integer ranging between 2-10, or between 2-5 (e.g. 4) and 'm' is an integer ranging between 0 to 2*'n' (on both side of the reparanda). Each possibility is a separate embodiment.

According to some embodiments, the method further comprises scoring permutations of permutation sets of subsequent edit zones, while implementing the repaired version of any previous edit zone until an edited conversation transcript output is obtained. According to some embodiments, the method further comprises applying an NLP model configured to validate the correctness of the edited conversation transcript output vis-à-vis the inputted conversation transcript and to validate the readability of the output text.

According to some embodiments, the edit zones are partially overlapping.

According to some embodiments, the fixing of syntactic and/or grammatic errors further comprises ignoring processing of pronouns and a predetermined list of unknown words, based on a pre-obtained word library.

According to some embodiments, the method further comprises applying the language model to determine whether or not to remove one or more of the 'm' commas.

According to some embodiments, the syntactic and/or grammatic errors are selected from extra spaces, case errors, typos, superfluous/missing punctuation, unsupported symbols, informally spelled words, word/phrase repetitions, and any combination thereof. Each possibility is a separate embodiment. According to some embodiments, for each identified typo an NLP model is applied to provide 'k' editing candidates, wherein 'k' is an integer of ≥2. According to some embodiments, each editing candidate is scored by applying a language model on the transcribed test in which the typo is replaced with the candidate. According to some embodiments, the transcribed text is edited to replace the typo with the editing candidate obtaining the highest score.

According to some embodiments, the method further comprises identifying scoring superfluous/missing punctuation candidates in the edited text and applying a language model thereon.

According to some embodiments, there is provided a system for enhancing/improving readability and/or coherency of a conversation transcript, the system comprising a processing circuitry configured to: receive and/or input a conversation transcript, apply an NLP model capable of automatically identifying and fixing syntactic and/or grammatic errors in the conversation transcript to obtain a grammatically corrected version of the conversation transcript, apply a speech disfluency detection model configured to identify speech disfluencies in the grammatically corrected conversation transcript and to provide an annotated conversation transcript indicating portions in the grammatically corrected conversation transcript comprising speech disfluencies, wherein the speech disfluencies are selected from filler phrases, discourse markers, reparanda and any combination thereof; remove any identified filler phrase and/or discourse marker; divide the annotated conversation transcript into edit zones, each edit zone comprising 'n' reparanda and 'm' commas surrounding the reparanda; generate a permutation set for an edit zone, each permutation in the permutation set including/excluding different of the 'n' reparanda and/or of the 'm' commas; thereby obtaining different optional versions of the grammatically corrected conversation transcript, score each permutation of the permutation set by applying a language model on the different optional versions of the grammatically corrected conversation transcript; and select the permutation receiving a highest score, thereby obtaining a repaired version of the edit zone.

According to some embodiments, each 'n' is an integer ranging between 2-10, or between 2-5 (e.g. 4) and 'm' is an integer ranging between 0 to 2*'n' (on both side of the reparanda). Each possibility is a separate embodiment.

According to some embodiments, there is provided an interactive platform for enhancing/improving readability and/or coherency of a conversation transcript, the platform comprising a user interface configured to enable a user to input/upload a conversation transcript, and a processing circuitry. According to some embodiments, the processing circuitry is configured to: receive the inputted/uploaded conversation transcript; apply an NLP model capable of automatically identifying and fixing syntactic and/or grammatical errors in the conversation transcript to obtain a grammatically corrected version of the conversation transcript; apply a speech disfluency detection model configured to identify speech disfluencies in the grammatically corrected conversation transcript and to provide an annotated conversation transcript indicating portions in the grammatically corrected conversation transcript comprising speech disfluencies, wherein the speech disfluencies are selected from filler phrases, discourse markers, reparanda and any combination thereof; remove any identified filler phrase and/or discourse marker; divide the annotated conversation transcript into edit zones, each edit zone comprising 'n' reparanda and 'm' commas surrounding the reparanda; generate a permutation set for each of the edit zones, each permutation in the permutation set including/excluding different of the 'n' reparanda and/or of the 'm' commas; thereby obtaining different optional versions of the grammatically corrected conversation transcript, score each permutation of the permutation sets by applying a language model on the different optional versions of the grammatically corrected conversation transcript; select the permutations receiving a highest score, thereby obtaining an edited version of the conversation transcript; and output on a display, visible to the user, the edited versions of the conversation transcript.

According to some embodiments, the edited version of the conversation transcript comprises meta-data describing the edits made vis-a-vis the inputted conversation transcript.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced.

In block diagrams and flowcharts, certain steps may be conducted in the indicated order only, while others may be conducted before a previous step, after a subsequent step or simultaneously with another step. Such changes to the orders of the step will be evident for the skilled artisan.

DETAILED DESCRIPTION

Figure 1:
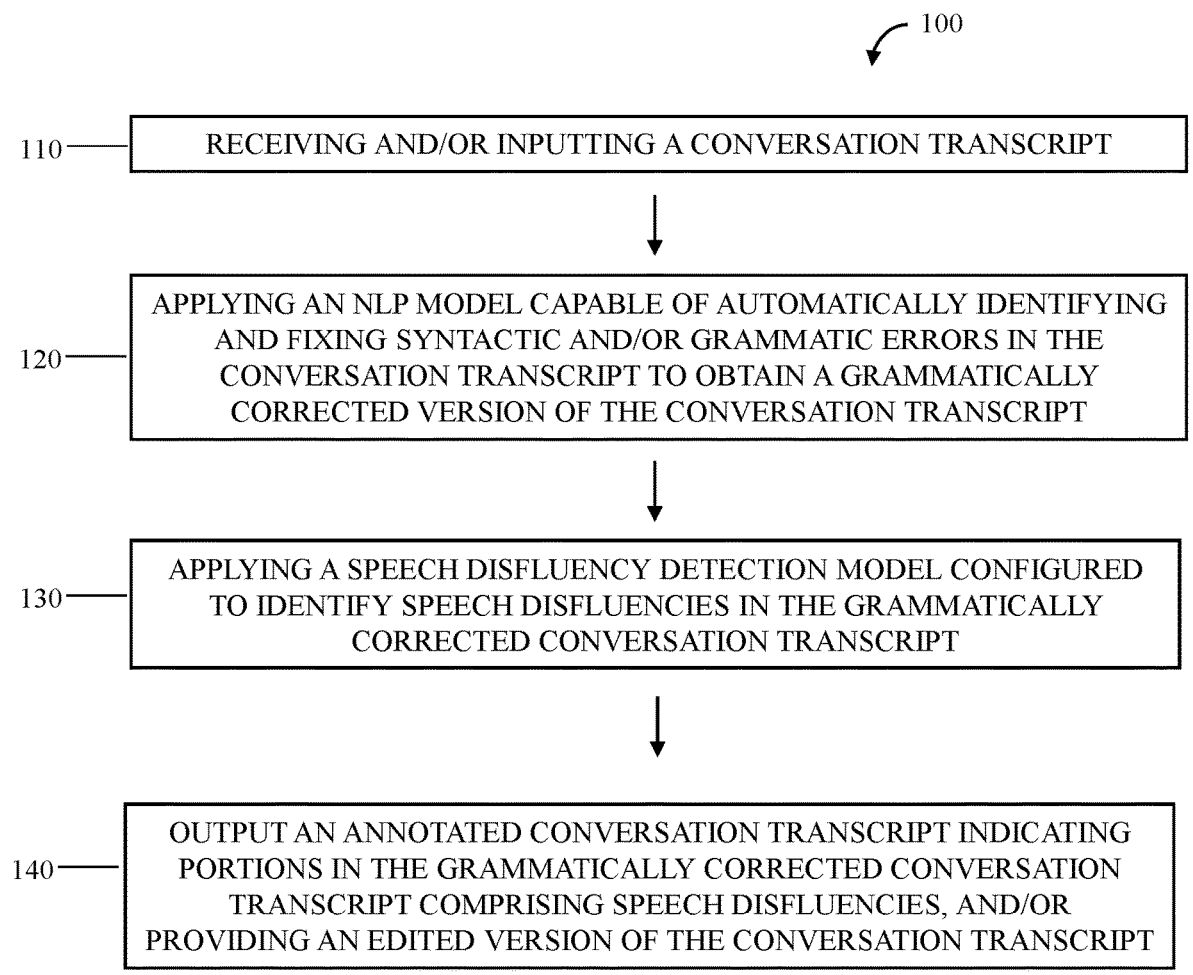
FIG. 1 is a flowchart of a computer implemented method for enhancing/improving the coherency and/or readability of a text transcript, according to some embodiments.

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

According to some embodiments, disclosed are a system, and computer implemented method for enhancing/improving coherency and/or readability of a text transcript, such as, but not limited to, a conversation transcript.

At a high level, the flow of the method includes:
1. Inputting a text transcript: In case, the text transcript is a conversation transcript, the utterances of each speaker may be annotated.
2. Name alignment: Includes fixing out-of-vocabulary names (proper nouns), based on phonetic rules/models and/or custom vocabularies; fixing words with incorrect vocabulary, identifying context; and optionally ignoring custom words (e.g. company names) based on a pre-obtained list of allowable out-of-vocabulary words.
3. Pre-processing: Includes removal of unsupported symbols, such as, but not limited to, emojis and other than alpha-numerical characters.

4. Grammar Correction: Includes one or more of the following:
   a. Fixing typographical errors (e.g. extra spaces, indents etc.).
   b. Adding/removing punctuation symbols (e.g. commas within compound sentences, question marks and the like).
   c. Converting non-formal phrases (such as gonna, wanna and gotcha) into formal language.
   d. Deleting (some cases of) word and phrase repetitions.
   e. Changing upper/lower casing.
   f. Fixing typos, optionally while ignoring custom words (e.g. company names), optionally based on a pre-obtained list of allowable out-of-vocabulary words.
5. Disfluent speech detection and correction: Discussed in further detail below.
6. Outputting edited text: Preferably with meta-data describing each edit made to the inputted text transcript.

As used herein, the terms "text transcript", "conversation transcript" and "transcribed text" refer to a text which has been automatically generated/converted from a speech recording, such as a conversation recording. The transcript is typically a word-for-word, written documentation of a recording.

According to some embodiments, the disfluent speech detection/correction may include identifying and removing redundant spans or filler phrases that complicates the understanding of a text during its reading.

Non-limiting examples of speech disfluencies include:
filler phrases such as, but not limited to, 'Oh' or 'Uhm'.
Discourse markers, such as, but not limited to, 'I mean', 'you know' or 'like'.
Reparanda which, for example, appear when a speaker corrects himself during speech (also referred to herein as "speech repair".

Speech repair typically occur when a subject speaks before he/she is sure of what he/she wants to say. Hence, the speaker might need to go back and repeat or modify what he/she just said. Of course, there are many different reasons why speakers make repairs; but whatever the reason, speech repairs are a normal occurrence in spoken dialogue. Typically, in a dialog, —25% of each speaker's speech contains at least one repair, which number rises to above 50% in sentences with more than ten words.

The speech repair typically includes three main parts: 1) The reparandum, 2) the interregnum and 3) the repair.

A non-limiting example of a speech repair is provided below:

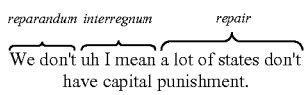

The reparandum 'We don't' is the part of the utterance that is replaced or repaired. The interregnum 'uh I mean' is not always present and may, for example, be replaced by a prolonged pause in the speech. The repair 'a lot of states don't' replaces the reparandum, such that the coherent and readable version of the text obtained after removing the reparandum and the interregnum is 'A lot of states don't have capital punishment'.

The reparandum is the stretch of speech that the speaker is replacing, and can end with a word fragment, where the speaker interrupts him/herself during the middle of a word. The end of the reparandum is the interruption point and is often accompanied by a disruption in the intonational contour. This can be followed by an editing term, which can include pauses, and utterances such as um or uh or cue phrases, such as I mean, well, or let's see. In order for the hearer to determine the intended utterance, he/she must detect the repair and determine the extent of the reparandum and editing term, also referred to as correcting the speech repair.

Hearers seem to be able to effortlessly understand speech with repairs in it, even when multiple repairs occur in a row. However, speech repair are particularly difficult for NLPs to handle.

According to some embodiments, the herein disclosed NLP model for correcting speech repair has the following flow.

Step 1: Remove filler phrases: For each interjection or interregnum compare the token to a predefined list of filler phrases, the list including filler phrases such as, but not limited to, 'you know', 'say', 'like', 'so', 'now', 'A', 'oh', 'uhm', 'uh', 'I mean'. If the tokens match, the token may be dropped. According to some embodiments, any comma adjacent to a removed phrase may be marked/tagged to indicate potential removal. For example, if a filler phrase is removed, any sequence of two or more consecutive commas may be merged into a single comma.

Step 2: Determine if reparandum should be removed. In this step, the objective is to attempt potential removal of the reparandum(s) and find the most likely permutation of the text. According to some embodiments, this is achieved by simulating the potential permutations, i.e. any combination of keeping or removing the reparandum(s), testing each permutation for text correctness and readability and choosing the best option. According to some embodiments, if the reparandum contains a negation, the sentenced must be checked for flipped meaning before removal. According to some embodiments, if the reparandum contains a negation, the negation is ignored.

The permutation testing algorithm can create a high number of potential permutations to test against, namely 2 to the power of identified reparanda. Therefore, according to some embodiments, in order to reduce the number of permutations checked simultaneously, the text transcript may be split into segments, also referred to herein as "edit zones". According to some embodiments, each edit zone may include a predetermined maximum number of reparanda, such as, but not limited to, 2, 3, 4, 5 or 6 reparanda, producing 2 to the power of 2, 3, 4, 5 or 6 permutations. Each possibility is a separate embodiment.

For each edit zone, all possible permutations regarding the retaining or the removing of reparanda are tested based "text-likelihood". The text likelihood is computed by processing/looking at an entire sentence or the entire text transcript which may include additional edit-zones that are not being edited or tested at that moment, in order to provide as much context as possible for choosing a most suitable permutation. According to some embodiments, determining the text likelihood comprises applying a language model configured to generate language, as further elaborated herein.

After a permutation has been selected for a first edit zone, the next edit zone can be tested, while applying the selected permutation, such that if a reparandum was removed in a first edit zone, when testing the next edit zone, vis-à-vis the entire sentence or the entire text transcript, it is the entire sentence or the entire text transcript devoid of the canceled reparandum. This process is repeated until all edit zones have been checked.

Step 3: Verification: Each edited/repaired edit zone is then evaluated. This evaluation may, for example, include checking if a deletion of a reparandum causes a change in the semantic meaning of a sentence, and/or checking if the deletion makes the probability of a sentence being generated by a LM model lower.

Reference is now made to FIG. 1, which is a flow chart 100 of a computer implemented method for enhancing/improving the coherency and/or readability of a text transcript, such as but not limited to, a conversation transcript.

It is understood that at least some of the steps may be carried out simultaneously and others may be switched in order. One of ordinary skill in the art will readily understand which steps need be sequential and which can be switched.

In step 110 of the method a conversation transcript is received and/or entered e.g. via a user interface.

In step 120, an NLP model capable of automatically identifying and fixing syntactic and/or grammatic errors in the conversation transcript is applied, to obtain a grammatically corrected version of the conversation transcript. The syntactic and/or grammatic errors may, for example, include extra spaces, case errors, typos, superfluous/missing punctuation, unsupported symbols, informally spelled words, word/phrase repetitions, and any combination thereof. Each possibility is a separate embodiment. A non-limiting example of a suitable NLP model capable of executing this task include the Python language tool (PyPI). According to some embodiments, fixing syntactic and/or grammatical errors may involve ignoring processing of pronouns and/or certain words, e.g. from a list of words or a word library. As a non-limiting example, a user may request that a company name be acknowledged as an allowable word, even if it is not a real word. In a similar manner, a term or a jargon not widely used may be indicated as permissible, and as such, not be identified as a typo. According to some embodiments, the unknown words or word library may be user-customized. For example, the user may add the words and/or the word library via a user interface.

According to some embodiments, for each identified typo an NLP model is applied to provide 'k' editing candidates, wherein 'k' is an integer of ≥2. Each editing candidate is then scored by applying a language model on the transcribed text in which the typo is replaced with the candidate. If the language model score of the transcribed text is higher with the candidate than with the original word, the original word is identified as a typo and the text is edited to replace the typo with the candidate.

According to some embodiments, for each typo (e.g. from left to right) in a sentence, taken from the conversation transcript, three top 3 replacement candidates (generated by an off-the-shelf model) are tested and each candidate is separately scored by replacing the original word with the candidate word, whereafter, the edited sentence is fed into the Language Model. The original word is then replaced by the highest scored candidate, before moving to the next typo.

Next, in step 130, a speech disfluency detection model configured to identify speech disfluencies in the grammatically corrected conversation transcript may be applied. According to some embodiments, the speech disfluency detection model may provide an annotated conversation transcript indicating portions in the grammatically corrected conversation transcript comprising speech disfluencies. According to some embodiments, the speech disfluency detection model may output an edited version of the grammatically corrected conversation transcript, in which the speech disfluencies have been corrected and/or tagged. According to some embodiments, the speech disfluencies may be selected from filler phrases, discourse markers, reparanda and any combination thereof. Each possibility is a separate embodiment.

In step 140 an annotated conversation transcript is outputted, indicating portions in the grammatically corrected conversation transcript which includes speech disfluencies or the correction of the speech disfluencies. Additionally or alternatively, an edited version of the conversation transcript may be outputted.

Figure 2:
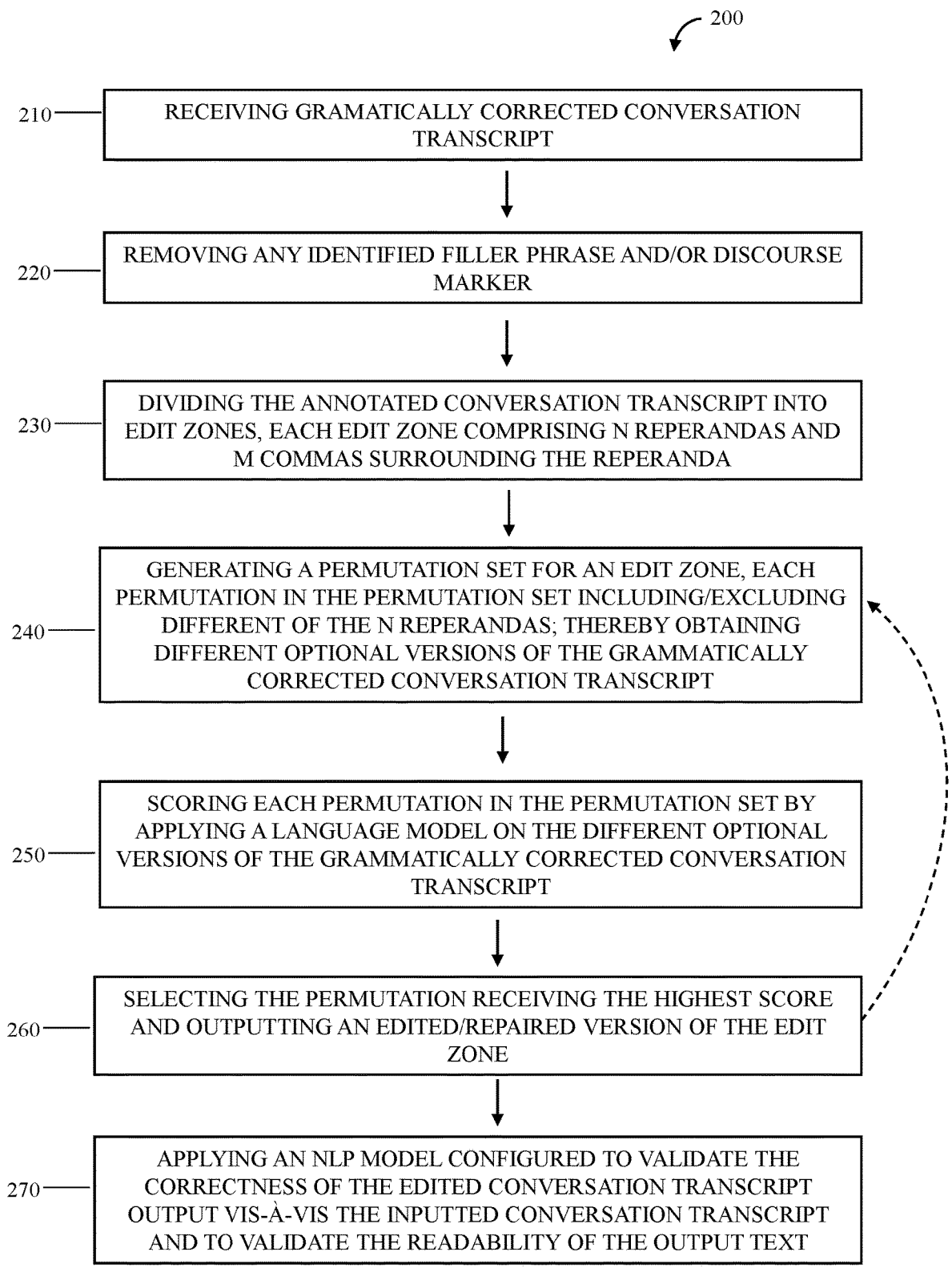
FIG. 2 is a flowchart of a computer implemented method for removing/repairing speech disfluencies in a text transcript, according to some embodiments.

According to some embodiments, editing the transcript to remove/repair speech disfluencies may be a multistep computational process (including one or more NLP models), which is outlined in the flowchart 200 of FIG. 2.

In step 210 a grammatically corrected transcript (e.g. conversation transcript) is received.

In step 220, filler phrase and/or discourse marker (if present) are removed. Filler words/phrases and discourse markers refer to words, phrases or sounds that fill up space in a conversation without adding substance. They are typically used to allow a speaker time to pause and consider what to say next. Non-limiting examples of filler words/discourse markers include 'Um', 'Uh', 'Er', 'Ah', 'Like', 'Okay', 'Right', 'You know', 'Totally', 'Literally', 'Well', 'You see', 'I mean', and 'I guess' etc.

In step 230, the conversation transcript, with the filler phrases/discourse markers annotated or erased, is divided into edit zones, each edit zone comprising 'n' reparanda and optionally 'm' commas surrounding the reparanda, wherein 'n' typically ranges between 2-10, or 2-5 and 'm' typically ranges between 0 to 2*n (on both side of the reparanda). Each possibility is a separate embodiment.

In step 240, a permutation set is generated for a first edit zone, each permutation in the permutation set including or excluding different of the 'n' reparanda; thereby obtaining different optional versions of the grammatically corrected conversation transcript. As a non-limiting example, if the edit zone includes 4 reparanda, a permutation set including 2 to the power of 4 permutations is generated.

In step 250, each permutation in the permutation set is scored by applying a language model on the different optional versions of the grammatically corrected conversation transcript and in step 260 the permutation receiving the highest score and outputting an edited/repaired version of the edit zone of the conversation transcript. According to some embodiments, the edited/repaired version of the conversation transcript includes meta-data annotating the editions. Additionally or alternatively, the edited/repaired version of the conversation transcript is a clean final version of the conversation transcript. According to some embodiments, scoring the permutations comprises applying a text generating NLP model (also referred to herein as "language model" or "LM"), based upon which the likelihood of a permutation being generated by the text generating NLP model is assessed.

Text generation is a subfield of natural language processing (NLP). It leverages knowledge in computational linguistics and artificial intelligence to automatically generate natural language texts, which can satisfy certain communicative requirements. Non-limiting examples of LMs that may be implemented include Recurrent Neural Networks (LSTM or GRU), Encoder-Decoder Models, Transformers, and Generative Adversarial Networks (GANs) or combinations thereof. Each possibility is a separate embodiment.

According to some embodiments, the text generation approach implemented may be Random Text Generation in which the LM is free to generate any text without being limited or directed by any specific rules or expectation or Controllable Text Generation which generates natural sentences whose attributes, such as tense, sentiment, structure, grammar, key terms/topics can be controlled.

According to some embodiments, the scoring further comprises taking into account the entire conversation transcript, thereby obtaining context to the assessment.

It is understood that once a first edit zone has been edited/repaired, a next edit zone of the conversation transcript may be processed by repeating steps 240-260 (as indicated by the arrow) until an edited/repaired version of the entire conversation transcript is obtained until all edit zones have been repaired/edited. According to some embodiments, the edit zone may be overlapping, e.g. include two reparanda of a previous edit zone and two reparanda of a subsequent edit zone. According to some embodiments, the edit zone may be non-overlapping, e.g. a first edit zone may include the first 4 reparanda in the conversation transcript and the next edit zone may include the next 4 reparanda etc.

According to some embodiments, the multistep computational process may further include an additional step (not shown) of applying a same or different NLP to determine whether or not commas need to be removed. It is understood, that in a text, transcript speech disfluencies, such as filler words and reparanda, may be surrounded by commas and removal of the filler words or the reparanda may result in superfluous commas. Such comma removal may at some instances be straight forward, such as deleting consecutive commas. However, at other instances a comma may change the meaning of a sentence in which case a flow similar to that illustrated for the reparanda must be applied. For example, permutations including or deleting a comma in an edit zone may be examined using an LM, as essentially described.

According to some embodiments, the algorithm works on the sentence level, i.e. all sentences are first extracted from the conversation transcript and the algorithm works on each sentence separately, thereby advantageously reducing the computational load. However, the algorithm may, according to some alternative embodiments, work on more than one sentence simultaneously (e.g. 2, 3, 4, 5 or more sentences).

In step 270, an NLP model is applied which can validate the correctness of the edited conversation transcript output vis-à-vis the inputted conversation transcript as well as the correctness and readability of the edited conversation transcript output. According to some embodiments, the validation is made by running a language model on both the edited conversation transcript and the inputted conversation transcript and ensuring the language model score is higher for the edited version than the inputted version.

As used herein the terms "machine learning" and ML may be used interchangeably and refer to computer algorithms that can improve automatically through experience and by the use of data. It is seen as a part of artificial intelligence. ML algorithms build a model based on sample data, known as training data, in order to make predictions or decisions without being explicitly programmed to do so.

As used herein the terms "natural language processing" and "NLP" may be used interchangeably and refer to the ability of a computer program to understand human language as it is spoken and written—referred to as natural language. It is a subfield of linguistics, computer science, and artificial intelligence concerned with the interactions between computers and human language, in particular how to program computers to process and analyze large amounts of natural language data. The goal is a computer capable of "understanding" the contents of documents, including the contextual nuances of the language within them. The technology can then accurately extract information and insights contained in the documents as well as categorize and organize the documents themselves. It is a component of artificial intelligence (AI). Natural language processing uses artificial intelligence to take real-world input, process it, and make sense of it in a way a computer can understand.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications, and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Section headings are used herein to ease understanding of the specification and should not be construed as necessarily limiting.

While certain embodiments of the invention have been illustrated and described, it will be clear that the invention is not limited to the embodiments described herein. Numerous modifications, changes, variations, substitutions and equivalents will be apparent to those skilled in the art without departing from the spirit and scope of the present invention as described by the claims, which follow.

The invention claimed is:

1. A computer implemented method for enhancing/improving readability and/or coherency of a conversation transcript, the method comprising:
   a) receiving and/or inputting a conversation transcript,
   b) applying an NLP model capable of automatically identifying and fixing syntactic and/or grammatic errors in the conversation transcript to obtain a grammatically corrected version of the conversation transcript, c) applying a speech disfluency detection model configured to identify speech disfluencies in the grammatically corrected conversation transcript and to provide an annotated conversation transcript indicating portions in the grammatically corrected conversation transcript comprising speech disfluencies, wherein the speech disfluencies are selected from filler phrases, discourse markers, reparanda and any combination thereof;

d) removing any identified filler phrase and/or discourse marker;

e) dividing the annotated conversation transcript into edit zones, each edit zone comprising 'n' reparanda and 'm' commas surrounding the reparanda;

f) generating a permutation set for an edit zone, each permutation in the permutation set including/excluding different of the 'n' reparanda; thereby obtaining different optional versions of the grammatically corrected conversation transcript, g) scoring each permutation of the permutation set by applying a language model on the different optional versions of the grammatically corrected conversation transcript; and h) selecting the permutation receiving a highest score, thereby obtaining a repaired version of the edit zone.

2. The method of claim 1, further comprising scoring permutations of permutation sets of subsequent edit zones, while implementing the repaired version of any previous edit zone until an edited conversation transcript output is obtained.

3. The method of claim 2, further comprising applying an NLP model configured to validate the correctness of the edited conversation transcript output vis-à-vis the inputted conversation transcript and to validate the readability of the output text.

4. The method of claim 1, wherein the edit zones are partially overlapping.

5. The method of claim 1, wherein step b further comprises ignoring processing of pronouns and a predetermined list of unknown words, based on a pre-obtained word library.

6. The method of claim 1, further applying the language model to determine whether or not to remove one or more of the 'm' commas.

7. The method of claim 1, wherein the syntactic and/or grammatic errors are selected from extra spaces, case errors, typos, superfluous/missing punctuation, unsupported symbols, informally spelled words, word/phrase repetitions, and any combination thereof.

8. The method of claim 7, wherein, for each identified typo, an NLP model is applied to provide 'k' editing candidates.

9. The method of claim 8, wherein each editing candidate is scored by applying a language model on the transcribed text in which the typo is replaced with the candidate.

10. The method of claim 9, wherein the transcribed text is edited to replace the typo with the editing candidate obtaining the highest score.

11. The method of claim 1, further comprising identifying scoring superfluous/missing punctuation candidates in the edited text and applying a language model thereon.

12. A system for enhancing/improving readability and/or coherency of a conversation transcript, the system comprising a processing circuitry configured to:

a) receive and/or input a conversation transcript, b) apply an NLP model capable of automatically identifying and fixing syntactic and/or grammatic errors in the conversation transcript to obtain a grammatically corrected version of the conversation transcript, c) apply a speech disfluency detection model configured to identify speech disfluencies in the grammatically corrected conversation transcript and to provide an annotated conversation transcript indicating portions in the grammatically corrected conversation transcript comprising speech disfluencies, wherein the speech disfluencies are selected from filler phrases, discourse markers, reparanda and any combination thereof;

d) remove any identified filler phrase and/or discourse marker;

e) divide the annotated conversation transcript into edit zones, each edit zone comprising n reparanda and 'm' commas surrounding the reparanda;

f) generate a permutation set for an edit zone, each permutation in the permutation set including/excluding different of the 'n' reparanda and/or of the 'm' commas; thereby obtaining different optional versions of the grammatically corrected conversation transcript, g) score each permutation of the permutation set by applying a language model on the different optional versions of the grammatically corrected conversation transcript; and h) select the permutation receiving a highest score, thereby obtaining a repaired version of the edit zone.

13. An interactive platform for enhancing/improving readability and/or coherency of a conversation transcript, the platform comprising a) a user interface configured to enable a user to input/upload a conversation transcript, b) a processing circuitry configured to:

i) receive the inputted/uploaded conversation transcript, ii) apply an NLP model capable of automatically identifying and fixing syntactic and/or grammatic errors in the conversation transcript to obtain a grammatically corrected version of the conversation transcript, iii) apply a speech disfluency detection model configured to identify speech disfluencies in the grammatically corrected conversation transcript and to provide an annotated conversation transcript indicating portions in the grammatically corrected conversation transcript comprising speech disfluencies, wherein the speech disfluencies are selected from filler phrases, discourse markers, reparanda and any combination thereof;

iv) remove any identified filler phrase and/or discourse marker;

v) divide the annotated conversation transcript into edit zones, each edit zone comprising 'n' reparanda and 'm' commas surrounding the reparanda;

vi) generate a permutation set for each of the edit zones, each permutation in the permutation set including/excluding different of the 'n' reparanda and/or of the 'm' commas; thereby obtaining different optional versions of the grammatically corrected conversation transcript, vii) score each permutation of the permutation sets by applying a language model on the different optional versions of the grammatically corrected conversation transcript;

viii) select the permutations receiving a highest score, thereby obtaining an edited version of the conversation transcript; and ix) output on a display, visible to the user, the edited versions of the conversation transcript.

14. The platform of claim 13, wherein the edited versions of the conversation transcript comprise meta-data describing the edits made vis-a-vis the inputted conversation transcript.

\* \* \* \* \*